KEYPUNCH JAM DETECTOR

Filed May 8, 1961 2 Sheets-Sheet 1

INVENTOR.
ROBERT STEENECK
BY R. H. Henderson
ATTORNEY

INVENTOR.
ROBERT STEENECK
BY R. H. Henderson
ATTORNEY 3,101,893
Patented Aug. 27, 1963

3,101,893
KEYPUNCH JAM DETECTOR

Robert Steeneck, New York, N.Y., assignor to The Western Union Telegraph Company, New York, N.Y., a corporation of New York Filed May 8, 1961, Ser. No. 122,047
10 Claims. (Cl. 234—32)

This invention relates to automatic data processing and more particularly to novel means for detecting malfunction of the card transport mechanism of unattended card punch devices.

Digital data processing and the transmission over long distances of digital data for business purposes has assumed a role of substantial importance in the operation of larger business, and it is convenient to carry out such transmission and the subsequent reception of data automatically, insofar as feasible. This is commonly accomplished by means of automatically operating card punching machines located at the terminal of a transmission line, and adapted to perforate paper cards in a suitable code according to information received over the transmission line.

Cards are used, of course, because of their convenience in classification and sorting, but are limited in the amount of information which they can store, so that it is necessary to provide for the very rapid sequential preparation of a large number of such cards. Machines commonly employed for the purpose feed from a stack of blank cards into a punching location where the information is applied to the individual card, then to a reading location where its accuracy is verified and repetitive information repunched therefrom to a following card, and then to a storage stack of punched cards in accordance with a prearranged program punched into a reference card located nearby.

It is found that when operated substantially unattended, as is the case when these machines are used for reception of business and industrial information, malfunction of the machine, which may be caused for example, by changes in ambient humidity, will cause tieup of the entire reception machinery. When the machine is attended, this is not serious, since a jam can be cleared by the operator very rapidly as soon as detected, but when the operator is preoccupied with other duties, as is frequently the case, the condition of malfunction may remain undetected for a considerable period of time during which expensive machinery is out of operation, schedules are delayed resulting in overtime, and the prompt analysis of information, which is a primary purpose of the entire installation, is defeated.

It is therefore a purpose of this invention to provide a card transport detector for a card punch machine which is effective to present an attention attracting signal and to shut down the card punch machine whenever a card which has been ordered from the blank stack for punching fails to be followed by the addition of a card to the storage stack after an appropriate short transfer period has elapsed.

It will be observed that for the first criterion mentioned, namely, the ordering of the card from the blank stack, it is sufficient to rely merely on the ordering of the card, since any subsequent failure of its physical progression into the indicated position is a detectable malfunction of the type necessary to be detected. For the second criterion, however, the adding of the card to the storage stack, only the physical movement of the card itself into, or in a manner unalterably committed to, actual storage is sufficient to preclude the possibility of an undetected failure.

Prior methods of card position detection have been known but because of the fact that they merely indicated the presence of a card in the reading and/or punching position, they were incapable of fulfilling the second criterion above noted, and were therefore prone to overlook a card jam which was beyond their capability to detect.

By means of the instant invention, any and all types of card feed failure from whatever cause and wherever occurring may be detected in the machine and signalled, in a manner not before possible.

This I accomplish by sensing as a first criterion, a specially punched card feed ordering hole of the program card at the time when it moves into the card ordering position. Detection of this circumstance is effected electrically by means of a conductive contact made when the feeler arm of an electric switch falls through the said hole as it moves into the said position and is effective to arm an electrical timing circuit, which, unless disarmed within a predetermined length of time spanning the operating time of the machine, is effective to sound an alarm.

Disarming of this circuit in normal operation is accomplished through detection, by means of the motion of a feeler arm, of the physical passage of a card into the storage stack, such motion acting to operate a switch for disarming the timing circuit and aborting the alarm only if it occurs within a predetermined time period elapsing since the arming of the circuit.

It is therefore one of the advantages of the present invention that malfunction of card feeding can be detected and reported without regard to the time or place of its occurrence in the machine.

It is a further advantage that by the employment of a time-sensitive prearranged program sensing means, the complete card punching operation can be monitored by the use of only one card detecting device.

It is a still further advantage of the invention that because of its above-mentioned time sensitivity it is capable of detecting and warning of stoppages in the card punching machine even though not due to malfunction of the cards themselves.

Another advantage of the invention is that it is applicable to all card transporting card punch machines, whether associated with data transmission channels or not.

Further advantages of the invention will be discerned from a consideration of the following detailed description of a specific illustrative embodiment of a preferred form thereof, wherein.

Figure 1:
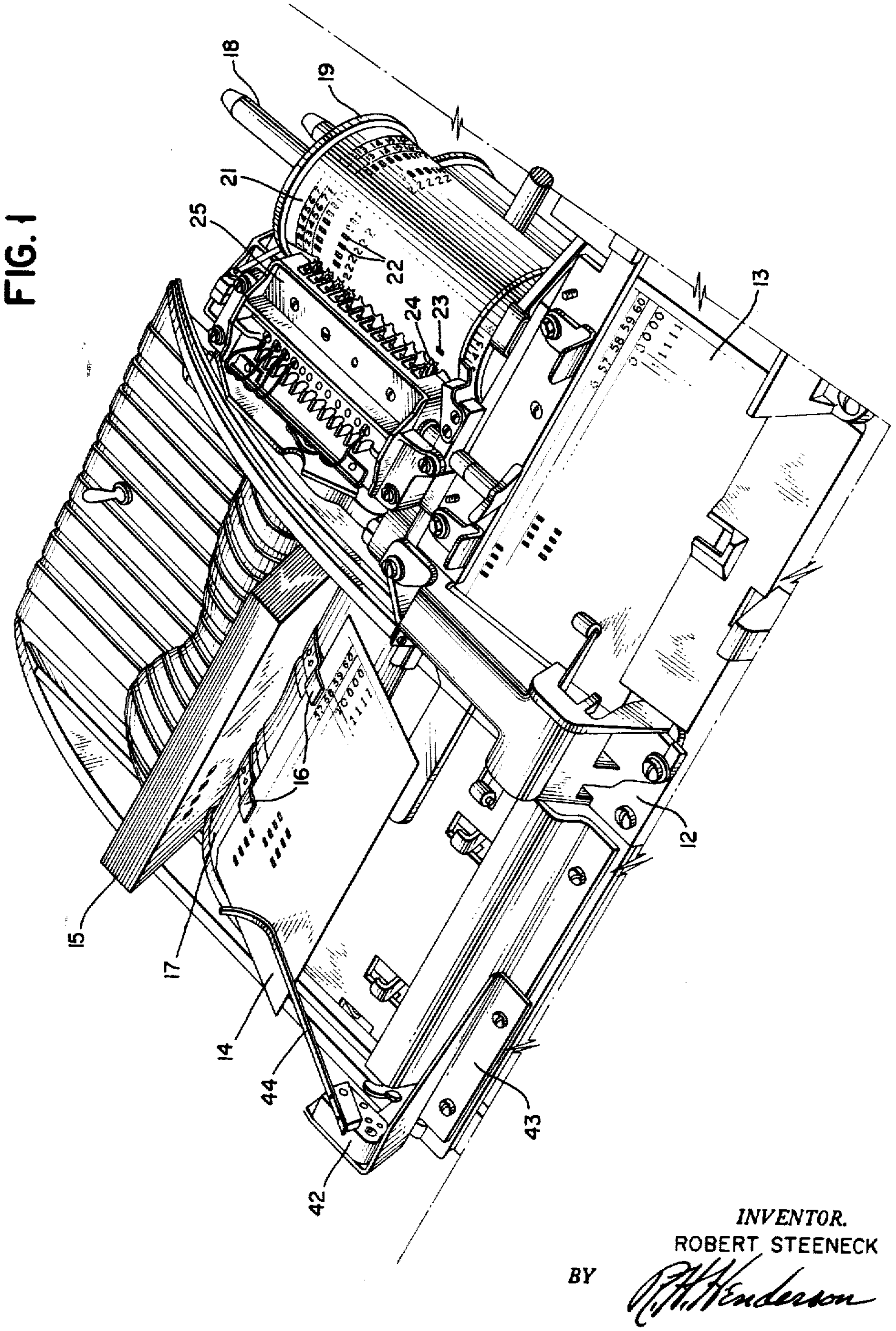
FIG. 1 is perspective view of a portion of the invention in place on a card punch machine.

Turning now to the drawings, there is seen in FIG. 1 a view from above of the work surface 12 of a card punch machine, having a card 13 in place in the reading position and a previous card 14 being moved into the stacking position in the card stack 15 by the fingers 16 of a revolving drum 17.

There is seen at 18 the shaft of a removable drum 19 on the surface of which is fastened the program card 21 having a variety of punched holes 22, and in particular the punched hole 23 in the bottom row of available hole positions, which is readable by the switch actuating rowel 24. Rowel 24 is one of a series of such devices installable or installed at each hole position level and having feeler points so spaced on a rotatable star wheel that in rolling over consecutive card holes the wheel is not lifted enough to operate its attached switch for each successive hole traversed, but does so only in changing from a punched to an unpunched hole position or vice versa.

The switch abovementioned as attached to rowel 24 is located beneath the plate 25 and is of conventional kind as illustrated diagrammatically and hereinafter explained.

The impingement of rowel 24 upon hole 23 as caused by the rotation of drum 19 upon shaft 18, which rotation occurs during the processing of each card such as 13, causes operation of the attached switch to provide a card ordering signal used in the instant invention. It is to be understood that in the normal operation of the device of FIG. 1, a card ordering signal is conventionally porduced by internal contacts associated and operated by the rotation of the drum 19, and is utilized for the actual energization of the machinery which moves a blank card from a storage stack not shown into a punching position immediately preceding card 13 shown. The card ordering signal first described, however, is an independently generated signal which is substantially a duplicate of the conventional and existing one in cases where the card 21 is punched with an appropriate hole 23.

Figure 2:
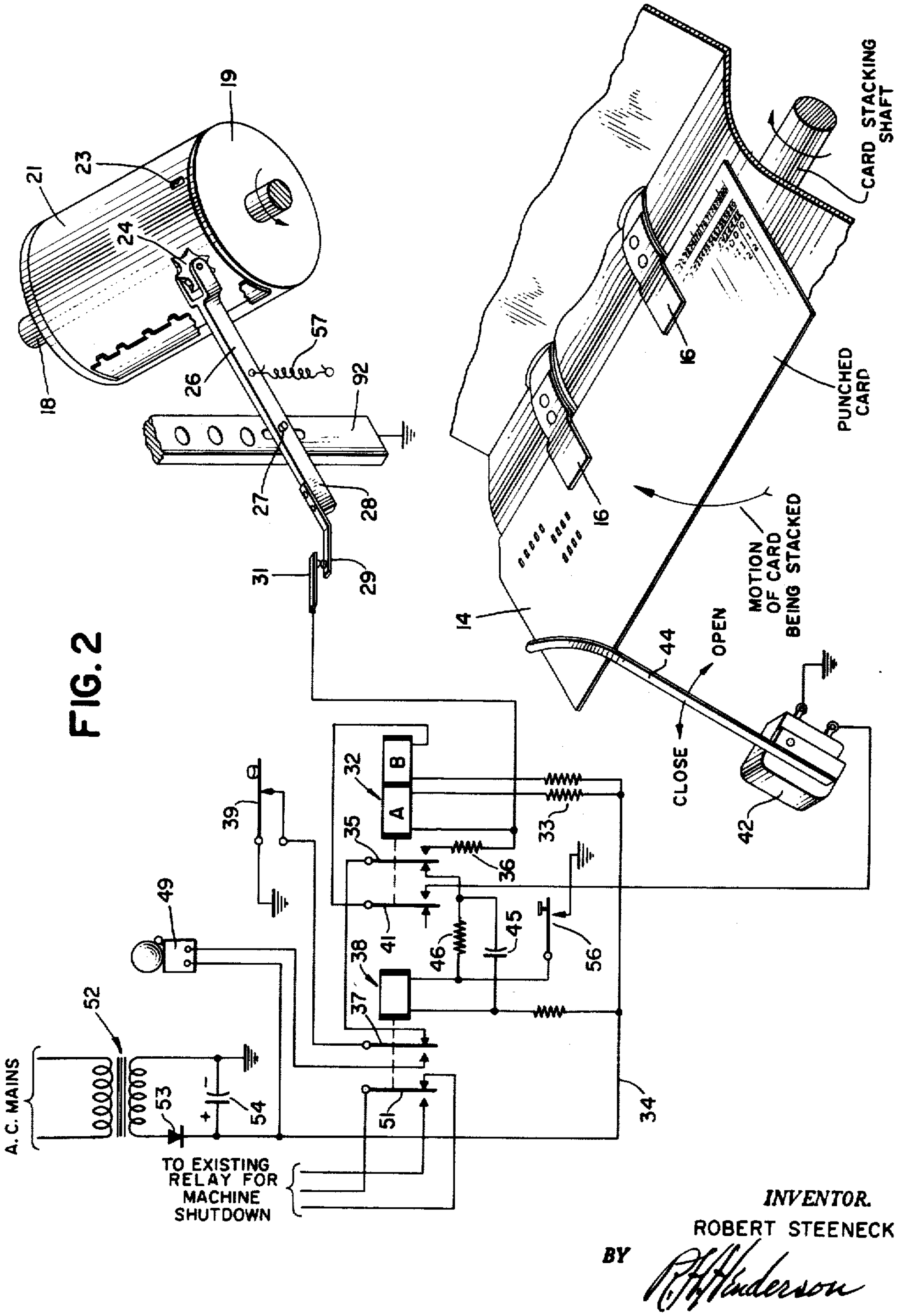
FIG. 2 is a diagrammatic representation of FIG. 1.

In the diagrammatic illustration of FIG. 2 it may be seen that the removable card 21 on the drum 19 causes rowel 24 which rolls on the card, to fall into the hole 23 when drum 19 is rotated, so that arm 26 is pulled downward by the fixed spring 57 a distance equal to the thickness of the card. This motion of arm 26 causes it to rock above a fixed pivot 27 and thus to cause a projecting portion 28 of arm 26 to lift, thus lifting the contact 29 thereon into electrical connection with the fixed contact 31. Since the pivot 27 and its mounting means 32 are grounded, thus retaining arm 26 and contact 29 always at ground potential, the contact 31 is thereby grounded upon the rowel 24 falling into the hole 23 simultaneously with the ordering out of a new card.

Contact 31 thus applied ground to the coil A of relay 32 the other end of said coil being energized through a limiting resistor 33 from the positive wire 34 so that relay 32 pulls in. Tongue 35 thereupon provides a holding circuit to ground through the limiting resistor 36, back contacts and tongue 37 of relay 38 and the switch 39 so that the immediately subsequent motion of card 21 will not cause relay 32 to drop out. Switch 39 is a card sensing switch located beneath the blank card stack in the machine and positioned to indicate by closure the presence of a card in the punching position. It is the conventional "out of cards" switch of the machine whose function is assimilated into the organization of the present invention and whose operation is later described.

It will be appreciated that the action of relay 32 thus far described is to pull up and lock in by its back contact during the brief period when rowel 24 encounters hole 23. A second coil B connected in opposition to the coil A, however, is at such time similarly energized and connected through a second back contact and tongue 41 to the switch 42.

Referring to FIG. 1, switch 42 is seen to be mounted on a bracket 43 on the machine 12, and to have an actuating arm in interfering contact with the card 14 being stacked by the fingers 16.

The upwardly swinging motion of card 14 upon entering the stack 15 lifts arm 44 and temporarily closes switch 42, a'ter which arm 44 falls back and the switch is reopened.

In FIG. 2 the closure of switch 42 is seen to apply ground to coil B of relay 32 thus energizing it, neutralizing the effect of coil A which is holding the relay in a locked up position, and causing it to fall open. This event normally occurs quite rapidly after the simulated card ordering signal has been issued by the closure of contacts 24 and 31 so that relay 32 remains in the pulled up condition for only brief periods. During these periods, ground is removed from the coil of relay 38 by the motion of tongue 37, the relay being otherwise similarly energized. Because of the fact, however, that a condenser 45 is normally connected between the high potential side of relay 38 and ground, it retains a supply of energy sufficient to discharge through resistor 46 into the coil of relay 38 during these periods of disconnection from ground, and hold it up, provided that the periods do not exceed a predetermined maximum time allowable for the normal motion of the cards as determined by the selection of a condenser 45 and a resistor 46 of suitable size to have a time constant taken in connection with the resistance of the coil of relay 38 which is appropriate for the purpose.

Relay 38 is thus seen to be energized during all periods of correct operation, and to fall open only during periods of malfunction of the card transpart mechanism. Upon falling out of relay 38, its tongue 37 applies ground to an alarm device such as bell 49 and a second tongue 51 operates contacts suitable for shutting down the machine. A power supply of conventional design comprises a transformer 52 connected to the A.C. mains and providing reduced secondary voltage which is rectified by the rectifier 53 and filtered to an approximation of direct current by the condenser 54.

It will be observed that failure of the power supply or of the relay 38 will nevertheless not prevent a shutting down of the machine, because of the "fail safe" configuration of the components.

The "out of cards" switch 39 is seen to interrupt the ground circuit normally completing the energization of relay 38, so that opening of this switch by an "out of cards" condition will cause relay 38 to fall open after a brief delay, shutting down the machine, but without providing the necessary ground current to sound bell 49. This is the required effect, since further operation of the machine under these conditions would be futile, but the condition is purely an operational one not warranting the sounding of a malfunction alarm.

It is to be noted that when the relay 38 falls out due to malfunction as described, the movement of its tongue 37 causes its ground circuit to be broken on the back contact, so that the relay is locked out regardless of further happenings, and the alarm continues to sound. After the indicated card jam has been corrected, however, or at any other desired time, the alarm can be silenced and the circuit restored to operating condition by manual closure of the key switch or push button switch 56, which applies ground to the coil of relay 38, pulling it up. Since at such times the contacts 29, 31 will be open and the relay 32 deenergized, relay 38 will thereupon lock up. Of course, if it is out of cards as indicated by switch 39 being open at such time, relay 38 would be prevented from locking up because of the breaking of the ground leg by switch 39 but since, as above explained, signal 49 does not sound under these circumstances, the reservation is trivial.

Although this invention has been described in terms of a specific illustrative example thereof it will be evident that there will occur to those skilled in the art various modifications and alternatives which do not depart, however, from the essential spirit of the invention, and it is therefore intended that the invention be limited only by the appended claims.

I claim:

1. Card jam detecting means for a card punch machine comprising card order signal sensing means, card stacking motion sensing means located adjacent the path of card travel at a card stacking position and responsive to card motion into a stacked position, first control means connected and responsive to said order signal sensing means to establish a first circuit condition upon sensing of a card order signal, and connected and responsive to said stacking sensing means to establish a second and alternative circuit condition upon sensing of card motion into a stacked position and second control means connected to and responsive to the circuit condition established by said first control means to sound an alarm upon undue persistence of said first circuit condition.

2. Card jam detecting means for a card punch machine comprising first sensing means on the machine for sensing a machine condition of requiring a new card, card stacking motion sensing means located adjacent the path of card travel at a card stacking position and responsive to card motion into a stacked position, first control means connected and responsive to said first sensing means to establish a first circuit condition upon sensing of a machine condition of requiring a new card, and connected and responsive to said stacking motion sensing means to establish a second and alternative circuit condition upon sensing of card motion into a stacked position and second control means connected to and responsive to the circuit condition established by said first control means to sound an alarm upon undue persistence of said first circuit condition.

3. Card jam detecting means for a card punch machine comprising card order signal sensing means, card stacking motion sensing means located adjacent the path of card travel at a card stacking position and responsive to card motion into a stacked position, first control means connected and responsive to said order signal sensing means to establish a first circuit condition upon sensing of a card order signal, and connected and responsive to said stacking motion sensing means to establish a second and alternative circuit condition upon sensing of card motion into a stacked position and second control means connected to and responsive to the circuit condition established by said first control means to sound an alarm upon undue persistence of said first circuit condition, said first circuit condition being a condition of deenergization.

4. Card jam detecting means for a card punch machine comprising card order signal sensing means, card stacking motion sensing means located adjacent the path of card travel at a card stacking position and responsive to card motion into a stacked position, first control means connected and responsive to said order signal sensing means to establish a first circuit condition upon sensing of a card order signal, and connected and responsive to said stacking motion sensing means to establish a second and alternative circuit condition upon sensing of card motion into a stacked position, second control means connected to and responsive to the circuit condition established by said first control means to initiate a continuous alarm upon undue persistence of said first circuit condition, and reset means to discontinue the alarm.

5. Card jam detecting means for a card punch machine comprising card order signal sensing means, card stacking motion sensing means located adjacent the path of card travel at a card stacking position and responsive to card motion into a stacked position, first control means connected and responsive to said order signal sensing means to establish a first circuit condition upon sensing of a card order signal, and connected and responsive to said stacking motion sensing means to establish a second and alternative circuit condition upon sensing of card motion into a stacked position and second control means connected to and responsive to the circuit condition established by said first control means to sound an alarm and stop the machine upon undue persistence of said first circuit condition.

6. Card jam detecting means for a card punch machine comprising card order signal sensing means, card stacking motion sensing means located adjacent the path of card travel at a card stacking position and responsive to card motion into a stacked position, first control means connected and responsive to said order signal sensing means to establish a first circuit condition upon sensing of a card order signal, and connected and responsive to said stacking motion sensing means to establish a second and alternative circuit condition upon sensing of card motion into a stacked position, second control means connected to and responsive to the circuit condition established by said first control means to sound an alarm and stop the machine upon undue persistence of said first circuit condition, reset means to discontinue the alarm, and out-of-card switch means on the machine and responsive to the exhaustion of a supply of blank cards to prevent the sounding of an alarm without preventing the stoppage of the machine.

7. A card jam detector for a card punch machine operating under control of a punched master card positioned on a program drum which comprises a first switch for reading the master card positioned to close in the card ordering position, a first relay having a first coil energized by said first switch to pull up the relay, a back contact on said relay for holding up by first coil energization after pulling up, a second switch positioned for interference with cards passing out of the operating portion of the machine and to close upon card passage, a second coil on said first relay, energized by closure of said second switch and in opposition to said first coil whereby to knock down said first relay upon card passage a resistor, a further back contact on said first relay and a second relay having a coil connected thereto and energized thereby through said resistor, a delay circuit comprising said resistor and a condenser connected in series across the coil of said second relay, and back contacts on said second relay to signal an alarm.

8. The method of signalling malfunction in a card punch machine having a program drum and a card stacking function which comprises punching a hole in a program card, mounting said card on the program drum in such position and orientation that the hole is indexed at the card ordering phase of machine operation, reading the card hole at the index position to create a card ordering phase indication, detecting the phase indication to provide a discrete circuit condition, signalling the passage of a card into the stack during the card stacking function, utilizing the signal to destroy said discrete circuit condition, integrating said discrete circuit condition with respect to time, comparing said integral with a predetermined standard, and signalling a malfunction alarm when said integral exceeds the standard.

9. In a card punching machine for storing information in cards by repetitive operations performed on cards fed from a stack and stored after completion in another stack a card feed order switch on the machine adapted to close at the card order phase of the machine cycle, a stacking switch on the machine adapted to be closed by the passage of a card into said other stack, first relay means responsive to the closure of said order switch and of said stacking switch and adapted to open a contact circuit only in the interval therebetween, second relay means in circuit with the contacts of said first relay means, energized thereby and having alarm contacts, and a delay circuit comprising electrical energy storage means and including said second relay means, for holding said second relay means pulled in for a predetermined period after failure of energization by said first relay means, whereby closure of said stacking switch prevents closure of said alarm contacts unless too long delayed.

10. The invention of claim 9 wherein said electrical energy storage means is a condenser.

References Cited in the file of this patent

UNITED STATES PATENTS

| | | |
|---|---|---|
| 2,484,111 | Mills | Oct. 11, 1949 |
| 2,604,944 | Kelley | July 29, 1952 |

UNITED STATES PATENT OFFICE

CERTIFICATE OF CORRECTION

Patent No. 3,101,893 August 27, 1963

Robert Steeneck

It is hereby certified that error appears in the above numbered patent requiring correction and that the said Letters Patent should read as corrected below.

Column 3, line 34, for "applied" read -- applies --; same column 3, lines 39, 50, and 54, column 4, line 38, and column 6, line 17, for "back", each occurrence, read -- front --; column 3, line 70, for "24" read -- 29 --.

Signed and sealed this 5th day of May 1964.

(SEAL)
Attest:
ERNEST W. SWIDER

Attesting Officer

EDWARD J. BRENNER
Commissioner of Patents